United States Patent
Woelfing et al.

(10) Patent No.: US 9,681,518 B2
(45) Date of Patent: Jun. 13, 2017

(54) LED LIGHTING DEVICE

(71) Applicant: SCHOTT AG, Mainz (DE)

(72) Inventors: Bernd Woelfing, Mainz (DE); Andreas Schneider, Neu-Bamberg (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/059,443

(22) Filed: Mar. 3, 2016

(65) Prior Publication Data

US 2016/0262240 A1  Sep. 8, 2016

(30) Foreign Application Priority Data

Mar. 6, 2015 (DE) .................. 10 2015 103 332

(51) Int. Cl.
*H05B 33/08* (2006.01)
*B64D 11/00* (2006.01)

(52) U.S. Cl.
CPC ......... *H05B 33/0884* (2013.01); *B64D 11/00* (2013.01); *H05B 33/083* (2013.01); *H05B 33/0809* (2013.01); *H05B 33/0824* (2013.01); *H05B 33/0848* (2013.01); *B64D 2011/0038* (2013.01)

(58) Field of Classification Search
CPC .............. H05B 37/029; H05B 33/0815; H05B 33/0824; H05B 33/0833; H05B 33/0809; H05B 33/0884; Y02B 20/342; Y02B 20/347; F21Y 2115/10; H02M 1/4258; H02M 3/33507; B64D 2011/0038
USPC ....... 315/294, 291, 297, 210, 312, 316, 122, 315/193, 226
See application file for complete search history.

(56) References Cited

U.S. PATENT DOCUMENTS

| | | | |
|---|---|---|---|
| 6,989,807 B2 | 1/2006 | Chiang | |
| 7,081,722 B1 | 7/2006 | Huynh et al. | |
| 7,863,829 B2 * | 1/2011 | Sayers | G06Q 50/06 315/153 |
| 8,541,951 B1 | 9/2013 | Shum et al. | |
| 8,736,178 B2 * | 5/2014 | Lee | H05B 33/083 315/122 |
| 8,901,835 B2 | 12/2014 | Kang et al. | |
| 8,937,433 B1 * | 1/2015 | Wang | H05B 33/0824 315/122 |

(Continued)

FOREIGN PATENT DOCUMENTS

DE  202013105445 U1  2/2014
EP  2670219 A2  12/2013

*Primary Examiner* — Haissa Philogene
(74) *Attorney, Agent, or Firm* — Ohlandt, Greeley, Ruggiero & Perle, L.L.P.

(57) ABSTRACT

An LED lighting device for connection to an AC voltage source is provided. The lighting device includes at least a first and a second set of LEDs, at least two LEDs assigned to the first set of LEDs and electrically arranged in series, and at least two LEDs assigned to the second set of LEDs and electrically arranged in series, a connector configured to connect the LED lighting device to the AC voltage source, and a set activator. The set activator having a voltmeter for measuring a currently applied voltage amplitude of the AC voltage source, a signal generator for generating a switching signal in response to the currently applied voltage amplitude, and a current controller for controlling the current flowing through the at least first and second sets of LEDs.

13 Claims, 6 Drawing Sheets

(5 of 6 Drawing Sheet(s) Filed in Color)

(56) References Cited

U.S. PATENT DOCUMENTS

| | | | | |
|---|---|---|---|---|
| 9,066,392 B2* | 6/2015 | Lee | ................... | H05B 33/0809 |
| 9,101,019 B2* | 8/2015 | Jong | .................. | H05B 33/0818 |
| 2010/0308739 A1 | 12/2010 | Shteynberg et al. | | |
| 2011/0084619 A1 | 4/2011 | Gray et al. | | |
| 2011/0273103 A1 | 11/2011 | Hong | | |

* cited by examiner

LED LIGHTING DEVICE

CROSS REFERENCE TO RELATED APPLICATIONS

This application claims the benefit under 35 U.S.C. §119 (a) of German 10 2015 103 332.1 filed Mar. 6, 2015, the entire contents of which are incorporated herein by reference

BACKGROUND

1. Field of the Invention

The invention relates to an LED lighting device, in particular for the purpose of cabin lighting.

2. Description of Related Art

The market for lamps and lighting devices is subject to rapid technological development and is highly sensitive with regard to the manufacturing costs of such lighting devices. Especially light-emitting diodes (LEDs) define the forefront of current research efforts, for example in the field of general lighting, but for instance also in the automotive industry and in aviation.

LED lamps are increasingly being introduced wherever low energy consumption on the one hand and special design options on the other hand are desired.

For example, it is well known to accommodate a plurality of individual LEDs together in one lamp, either to increase light intensity, or to obtain for instance a 2-dimensional or, more generally, an expanded luminous surface area. In the field of general lighting, ceiling panels for open-plan offices can be mentioned here, which were previously implemented using fluorescent tubes, which now are more and more replaced by LEDs. In the automotive sector, by contrast, the design aspect is being increasingly exploited, which for instance allows to distribute LEDs along car body lines.

In aviation, for example in the area of cabin lighting in wide-body aircraft, it would also be desirable to replace the conventional light panels by modern LED lighting technology.

However, in aviation, the power supply of the cabin which sometimes is significantly fluctuating is a high hurdle. For example, it is possible that the auxiliary power unit (APU) of a wide-body aircraft provides a different voltage level than the ground power supply to which the aircraft is typically connected on the ground. Also, the voltage level of the ground power supply may vary from airport to airport. Furthermore, for instance the APU may supply a fluctuating voltage level. Finally, it also happens that over voltages arise that exceed the tolerated input voltage of the cabin lighting and may cause defects in the cabin lighting.

In prior art cabin lighting, voltage fluctuations are typically balanced in a manner so that the brightness of the cabin lighting fluctuates. That means, in case of an elevated voltage, power consumption of the cabin lighting will be higher. When the aircraft is connected to the ground power supply, brightness of the cabin lighting increases or drops, but also during the operation of the aircraft the brightness of cabin lighting may be subject to clearly visible fluctuations.

Therefore, a major technical challenge is to tolerate different voltage levels for a lighting device and at the same time ideally always provide the most consistent brightness possible with the lamp.

Another problem arises from the fact that LEDs are direct current (DC) devices which have to be connected to the typically existing AC voltage sources. This is particularly relevant with regard to the cost aspect, since as a matter of course many ways for obtaining DC voltage from AC voltage have already been known, for instance by using conventional power supply units, but further simplifications and/or cost savings are always sought for, for instance for the mass market. In particular, if stringent requirements are imposed on the power factor, conventional circuit complexity is significant.

Finally, it is moreover desirable to reduce the number of components which are necessary for connecting the lamp to the AC voltage source, for example in order to reduce maintenance costs, if the lamp is used in an application field where lamps are still maintained (e.g. in aviation).

Given this background, the applicant Schott AG has developed an LED lighting device which achieves the object of tolerating temporally varying voltage sources.

Moreover, the LED lighting device developed by the applicant is capable of achieving a particularly uniform brightness distribution. In particular, the developed LED lighting device is able to provide constant brightness even in case of a fluctuating amplitude of the AC voltage supply.

Finally, the developed LED lighting device is able to tolerate over voltages in a particularly simple manner so as to increase service life of the LED lighting device in an environment prone to over voltages.

Further objects will become apparent from the following description and the particular advantages obtained with specific embodiments.

The invention provides an LED lighting device for connection to an AC voltage source. The LED lighting device comprises at least a first and a second set of LEDs. Each set of LEDs comprises at least one LED assigned to the respective set of LEDs. Preferably, the LED sets are electrically arranged in series.

The first set of LEDs preferably comprises at least two LEDs assigned to the first set of LEDs and electrically arranged in series. In other words, the at least two LEDs are electrically connected in series; the first set of LEDs may for instance comprise three, four, five, six, or seven LEDs as well, which are electrically connected in series. In case of a plurality of LEDs per LED set, the same amperage passes through the LEDs of the first LED set so that all the LEDs of the first LED set essentially have the same brightness—apart from possible manufacturing variations of the LEDs. The LEDs of one set of LEDs, for example the first set of LEDs, are jointly enabled or disabled according to the invention, that means they form a unit in electrical terms.

The second set of LEDs also preferably comprises at least two LEDs assigned to the second set of LEDs and electrically arranged in series. The LEDs of the second set of LEDs can be regarded as electrically independent from the LEDs of the first set, so that although the LEDs assigned to the second set of LEDs are always considered together—in analogy to the LEDs of the first set of LEDs—but typically the LEDs of the first set are not enabled or disabled together with the LEDs of the second set.

In a preferred embodiment, further sets of LEDs are additionally provided, and each set of LEDs preferably comprises at least two LEDs, for example a third, a fourth, a fifth, a sixth and/or a seventh set of LEDs. To cite an example, an LED lighting device comprising 7 sets of LEDs and 6 LEDs per set of LEDs may thus comprise 42 individual LEDs in total.

The LED lighting device comprises a connecting means for connecting the LED lighting device to the AC voltage source. On the one hand, the connecting means provides for the connection to the voltage source, for example by means of a plug-in connector. Furthermore, the connecting means comprises a rectifier, such as a bridge rectifier or diode rectifier. The rectifier is able to modify the AC voltage in known manner so that no negative voltage amplitudes will be applied to the components of the LED lighting device any more, but all voltage amplitudes will extend in the positive direction. Thus, a higher power proportion of the voltage source can be exploited. Moreover, LEDs typically have a pass direction and a reverse direction, and LEDs operated in the reverse direction could possibly even be damaged.

The LED lighting device further comprises a set activation means. The set activation means enables or disables the sets of LEDs, in particular by means of a preset value, more generally by means of an activation instruction. For example, an amperage set point instruction may be provided. In other words, the set activation means defines an amperage target value for each set of LEDs, preferably the same amperage target value for each set of LEDs.

Set activation will be explained in more detail by way of the following example illustrating one way of implementation of the set activation means. In this example, the set activation means comprises a respective current controller assigned to each set of LEDs. Each current controller receives an amperage set point instruction. With the rising edge of the applied voltage source, the first set of LEDs is then supplied with electric power, the LEDs begin to light up. As soon as the voltage is sufficient to connect another set of LEDs in series, current begins to flow through this set of LEDs. In particular, the current controller assigned to the first set of LEDs opens or closes an electrical connection so that then current also passes through the second set of LEDs. In the same way, further sets of LEDs are enabled with further increasing voltage level of the voltage source.

In principle, therefore, the sets of LEDs may be connected and disconnected in response to the measured voltage amplitude even during the time period of an oscillation period (phase) of the AC voltage. Power consumption of the LED lighting device is thus adapted to the power provided by the power supply, even and especially within one oscillation period.

Thus, in a simple example, starting at 0 volts, initially the first set of LEDs is enabled during the rising edge and current can flow through the first set of LEDs. The remaining sets of LEDs thus initially remain disabled, until a threshold defined by the set activation means is exceeded. As soon as the threshold is exceeded, the next set of LEDs is enabled (or disabled in case of a falling edge). In the present example, the second set of LEDs will be enabled once the threshold value has been exceeded. If further sets of LEDs are provided, the third set of LEDs is enabled for instance as soon as a second threshold has been exceeded.

During the falling edge of the voltage waveform, the sets of LEDs may for instance be disabled in the reverse order.

By successively activating and deactivating sets of LEDs during an oscillation period of the voltage source, a power factor corrected (PFC) pseudo-resistive load is thus provided, which can be directly connected to the voltage source.

The desired amperage passing through each set of LEDs may preferably be adjusted by the current controller. In case of a fluctuating voltage source, this allows to adapt the LEDs and in particular the brightness of the LEDs to the applied voltage level. For example, in case of a higher voltage the voltage source exhibits a steeper slope of the phase, so that the sets of LEDs are enabled slightly earlier. In response to the slope of the phase rise, the set activation means may therefore preferably adjust the threshold(s) for the current controller. In case of a steeper phase slope this means that a lower threshold is set, in order to obtain the same light output from the LEDs and thus the same overall brightness as a result.

The threshold for a specific set of LEDs in particular results from the voltage applied. Each connected set of LEDs has associated therewith a current value which can be controlled.

The current controller does not only permit to keep the brightness of the LED lighting device as constant as possible in case of a fluctuating voltage source. The current controller may furthermore be configured so that the brightness of the LED lighting device can be adjusted to a desired value. This may for instance be achieved by adjusting the activation instruction.

With the current control for controlling the current passing through the at least first set of LEDs, brightness fluctuations of the LEDs due to fluctuations of the voltage amplitude of the voltage source can be compensated for. In general terms, the current controller controls the current flowing through the set or sets of LEDs. Preferably, the current controller may control the current for each set of LEDs individually, or a respective separate current controller is preferably provided for each set of LEDs. By employing graduated current control associated with the sets of LEDs, an adjustable good PFC can be achieved.

In a simple case, the current controller may for instance be implemented by operational amplifiers, Darlington transistors, or by FETs, which compare a set point amperage with an actual amperage in the electrical circuit.

Furthermore, by controlling the amperage of the LEDs in a set of LEDs by the current controller, the light output of the LED is adjusted.

The activation instruction may as well comprise a preset voltage value, as will be explained by way of the following example. With the voltage of the voltage source increasing, initially the first set of LEDs is enabled. With the voltage further increasing beyond the threshold voltage, which is for instance just below the maximum voltage tolerable by the individual LEDs, the second set of LEDs can be activated in response to the measured voltage, e.g. by an activation instruction such as a switching signal from the signal generator. The second set of LEDs is preferably electrically connected in series to the first set of LEDs. The voltage drop across each individual LED is thus shifted downstream and the LEDs of both the first and the second set of LEDs will emit light of the same intensity. If the voltage of the voltage source or the voltage drop across each individual LED rises again beyond the threshold voltage, the third set of LEDs is optionally enabled, whereby the voltage drop across each individual LED will be reduced again.

Thus, the individual LEDs can always be operated in a safe range, without causing damage to individual LEDs or to the LED lighting device.

For sensing the phase rise or detecting the voltage amplitude, the set activation means may comprise a voltmeter for measuring a currently applied voltage amplitude of the AC voltage source. The voltmeter detects the voltage amplitude, preferably continuously, for adjusting the threshold value(s) based thereon. The voltmeter preferably integrates over several periods in order to provide for a more uniform light output.

The enabling and disabling of LED sets during an oscillation period causes flickering of the LED lighting device. However, already at frequencies of typical household AC voltages of e.g. 60 Hz (as in the United States of America) or 50 Hz (as in Europe) this flickering is not or not readily noticeable by the human eye. So, all in all, the flickering is tolerable because it does not impair the aesthetic requirements on the LED lighting device. Rather, brightness of the LED lighting device will be perceived as constant. The total luminance emitted by the individual LEDs during one phase is perceived by the human eye as an integrated total value. The contributions of the LED sets to the total luminance will typically be different, since one set of LEDs may have a duty cycle different from that of another set of LEDs, for example. Moreover, frequencies used for power supply in aviation are typically about 400 Hz. Therefore, the flickering is far less remarkable in this case.

In one embodiment, the set activation means of the LED lighting device may comprise a signal generator for generating a switching signal in response to the currently applied voltage amplitude. It is also possible for the sets of LEDs to be switched, i.e. enabled or disabled, by the switching signal. In other words, the activation instruction is implemented by the switching signal in this case.

According to the invention, the individual LEDs are adjacently surrounded by LEDs which are assigned to the respective other set of LEDs. In other words, any LED of the first set of LEDs is arranged so that all adjacent LEDs are not assigned to the first set of LEDs.

Particularly preferably, the LED lighting device is an expanded LED lighting device. In other words, the LED lighting device extends across an area or along a line. It has been found in the context of the invention that light distribution of the expanded LED lighting device is perceived as particularly homogeneous across the area or along the line, when the LEDs of an LED set are arranged so as to be distributed over the area or along the line. The "mixing" of individual LEDs of different sets is very effective when the LEDs of a specific set are not used side by side. A most homogeneous light distribution across the expanded LED lighting device is achieved when LEDs of all employed sets or as many of the employed sets as possible alternate each other.

Preferably, the LED lighting device further comprises a switching means for connecting or disconnecting at least one set of LEDs in response to the switching signal. Thus, the LEDs can be enabled or disabled in sets by the switching means.

The LEDs of the LED sets are preferably uniformly distributed over the area or along the line occupied by the LED lighting device. In a particular embodiment, the LEDs of the LED sets are distributed over the area or along the line occupied by the LED lighting device in a checkerboard-like pattern. Similarly to a checkerboard, the LEDs of the first set occupy a first color, the LEDs of the second set a second color. In the case of more than two sets, the checkerboard analogy may be extended mentally to more than two colors. This could also be called checkerboard-like.

In other words, the LEDs of an LED set are spaced apart from one another. Preferably, the LEDs of a set of LEDs are arranged in distributed manner so that the LEDs of a set of LEDs are distributed over the entire extension of the LED lighting device.

The LED lighting device preferably comprises at least one further LED set, and each LED is adjacently surrounded by LEDs that are assigned to another set of LEDs.

The optional switching means of the LED lighting device may be configured so as to adjust the number of enabled LED sets such that the LEDs of the LED sets are operated near their nominal voltage. When the LEDs are operated at about their nominal voltage, the highest possible light output is resulting, so that the efficiency of the LED lighting device rises. Operation of the LEDs near their nominal voltage may also be achieved by means of the set point instruction for instance for the amperage threshold value.

Preferably, the LED lighting device comprises at least one overvoltage diverting component, or, more generally, a voltage diverting component. The voltage diverting component is preferably capable of absorbing an excess voltage or overvoltage so that the LEDs of the LED sets will not be damaged even if the maximum total voltage across all individual LEDs is exceeded. An overvoltage exists when the voltage amplitude of the supply voltage is above the voltage level for which the LED lighting device is designed when in normal operation.

Rather, the excess voltage is diverted to the voltage diverting component. Most preferably, the at least one voltage diverting component is a non-luminous component, e.g. non-luminous diodes or resistors. Optionally, the voltage diverting component may be defined by a set of LEDs otherwise identical to the other sets of LEDs, but covered or attached so as to be obscured, so that this set of LEDs does not contribute to the overall brightness of the LED lighting device.

Thus, if an overvoltage arises, which may for instance occur regularly in the field of aviation, the LED illumination device will not become more bright or be subject to a brightness fluctuation, in contrast to conventional lamps, rather the additional power from the overvoltage can be diverted by the voltage diverting component.

Preferably, the set activation means is configured for diverting the excess voltage via the at least one voltage diverting component. For this purpose, the set activation means may connect the non-luminous component in series with the sets of LEDs, when needed.

In other words, the non-luminous component is capable of reliably diverting an overvoltage so as to preserve the LED lighting device from damage, while at the same time avoiding undesirable fluctuations in brightness of the LED lighting device.

The LED lighting device may comprise the LEDs of the sets of LEDs mentioned above, which may be assigned to a first diode string, and may further comprise a second diode string with further LEDs, which is electrically arranged in parallel to the first diode string and also comprises further sets of LEDs.

The invention will now be explained in more detail by way of exemplary embodiments and with reference to the figures, in which the same and similar elements are partly designated with the same reference numerals, and wherein the features of the different exemplary embodiments can be combined with each other.

DESCRIPTION OF THE FIGURES

The patent or application file contains at least one drawing executed in color. Copies of this patent or patent application publication with color drawing(s) will be provided by the Office upon request and payment of the necessary fee.

In the drawings.

DETAILED DESCRIPTION

Figure 1:
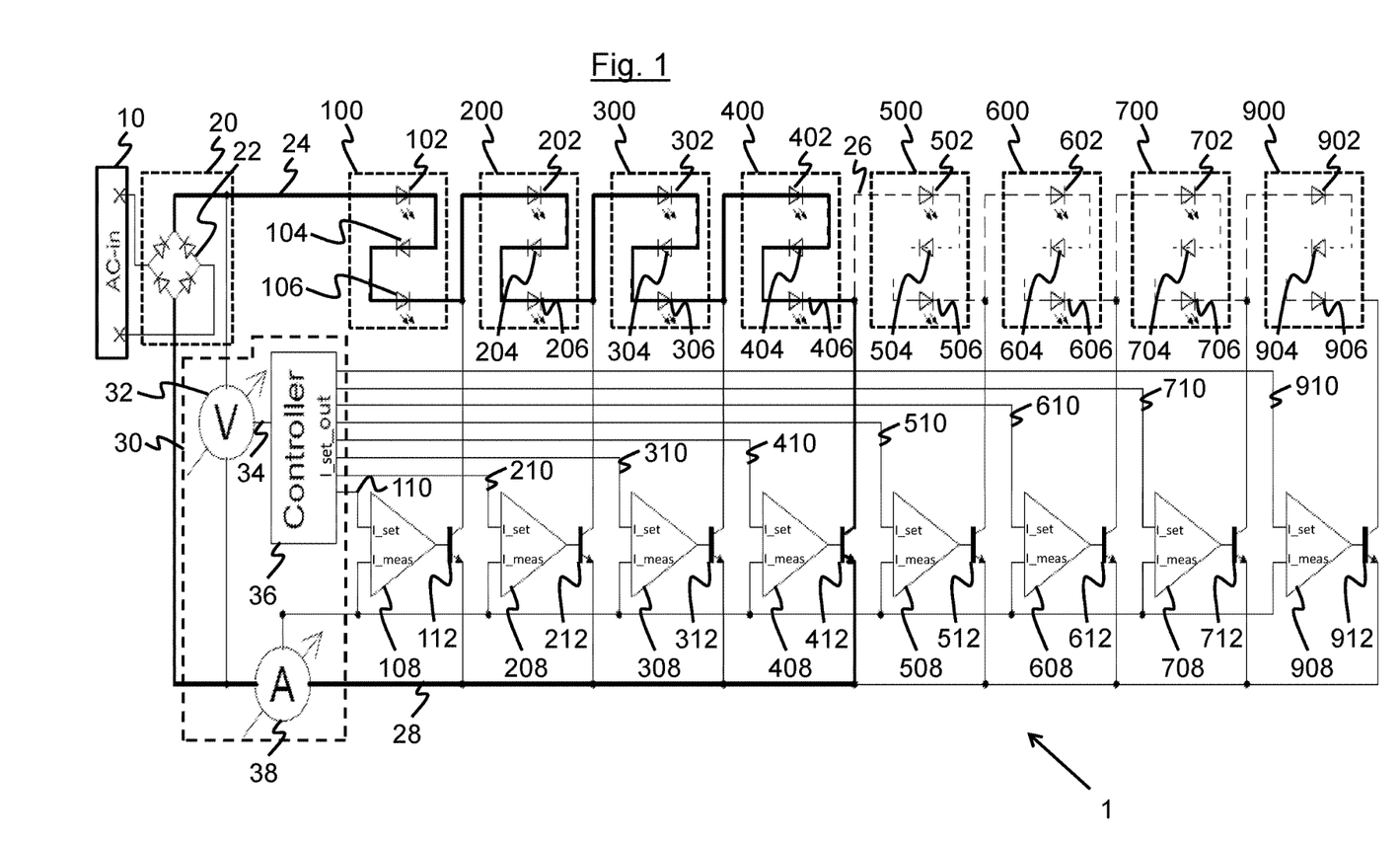
FIG. 1 shows a circuit diagram on which one embodiment of an LED lighting device according to the invention is based.

FIG. 1 shows a simplified circuit diagram of one embodiment of LED lighting device 1. This embodiment comprises seven sets of LEDs 100, 200, 300, 400, 500, 600, and 700. In this example, the sets of LEDs 100, 200, 300, 400, 500, 600, and 700 each comprise a first, second, and third LED 102, 104, 106; 202, 204, 206, etc. In other words, the first set of LEDs 100 comprises first LED 102, second LED 104, and third LED 106. The second set of LEDs 200 comprises first LED 202, second LED 204, and third LED 206. Thus, this embodiment comprises 3 times 7, i.e. 21 LEDs in total, 102, 104, 106; 202, 204, 206; 302, 304, 306; 402, 404, 406; 502, 504, 506; 602, 604, 606; 702, 704, 706, which are used for illumination purposes.

A voltage source 10 provides an alternating voltage (AC voltage) to which the LED lighting device 1 is connected via connecting means 20. Connecting means 20 comprises a rectifier 22.

In the illustrated example of FIG. 1, a voltage diverting component 900 is provided, which comprises further diodes 902, 904, and 906. Voltage diverting component 900 is capable of reliably absorbing over voltages, thereby protecting the LEDs of the LED sets from being damaged.

Voltage diverting component 900 may as well employ ohmic resistors 902, 904, 906 to absorb the over voltages.

In the example of FIG. 1, a current flows through the first set of LEDs 100 and through the second, third, and fourth sets of LEDs 200, 300, 400, which is indicated by the solid electrical line 24. By contrast, the other sets of LEDs 500, 600, 700 and the voltage diverting component 900 are disabled in this example, which is indicated by the dashed electrical line 26.

LED lighting device 1 comprises a set activation means 30 which in response to a voltage measured by voltmeter 32 enables individual ones or all of the LED sets. For example, an amperage target value is transmitted via signal lines 110, 210, 310, 410, 510, 610, 710 to current controllers 108, 208, 308, 408, 508, 608, 708, as an activation instruction or signal.

A voltmeter 32 measures the voltage amplitude provided by voltage source 10. In the present example, voltmeter 32 acquires the readings electrically downstream of rectifier 22, so that the voltmeter 32 will already measure only positive half waves of the alternating voltage. The voltage signal acquired by voltmeter 32 is transmitted via a voltage signal line 34 to signal generator 36.

Signal generator 36, in turn, is capable of enabling or disabling the individual sets of LEDs 100, 200, 300, 400, 500, 600, 700 and voltage diverting component 900 by means of the activation instruction or a switching signal. In the present example, an amperage threshold value I_set is initially stored in signal generator 36 for this purpose, which is transmitted via signal lines 110, 210, 310, 410, 510, 610, 710, 910 to current controllers 108, 208, 308, 408, 508, 608, 708, 908, as a preset value.

For example, amperage threshold value I_set is transmitted via signal line 110 to first current controller 108, and first current controller 108 is adapted to control the amperage flowing through LEDs 102, 104, 106 of the first set of LEDs 100.

Current controller 108, like current controllers 208, 308, 408, 508, 608, 708, 908 in the example of FIG. 1, receives as a further reference the amperage actually measured by amperemeter 38, for subsequently adjusting the measured amperage to the preset value I_set. Amperemeter 38 is connected into the electrical line 28 in this case. After comparison of the amperage I_meas as measured by amperemeter 38 with the amperage target value transmitted via signal line 110 as a preset value I_set as a switching signal by current controller 108, the latter controls the amperage flowing through the LEDs 102, 104, 106 of the first set of LEDs 100.

Preferably, as shown in the embodiment of FIG. 1, each set 100, 200, 300, 400, 500, 600, 700, 900 has a switching means 112, 212, 312, 412, 512, 612, 712, 912 associated therewith.

For example, current controller 108 acts on switching means 112 in a manner so that the first set of LEDs 100 can be enabled or disabled as a set in response to the switching signal. This similarly applies—mutatis mutandis—to the further sets. For example, in the initial state the current controllers are switched so that the current flows through the first set of LEDs and through the closed first switching means 112, e.g. transistor 112. With increasing voltage, the second switching means 212 also closes, while the first switching means optionally opens.

Figure 2:
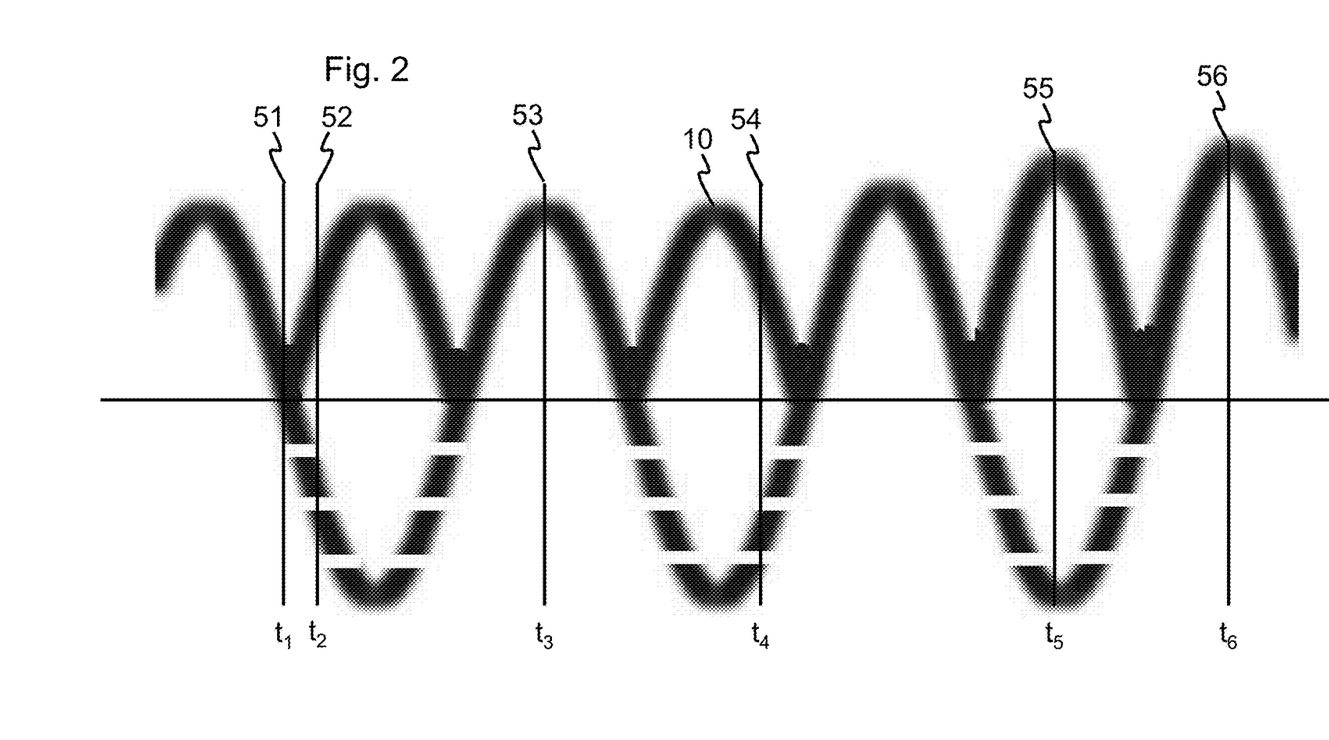
FIG. 2 shows an exemplary voltage waveform.

FIG. 2 shows a possible voltage waveform of an AC voltage provided by voltage source 10. At time lines $t_1$, $t_2$, $t_3$, $t_4$, $t_5$, and $t_6$ as indicated in FIG. 2, the corresponding state of the LED lighting device 1 will be described.

Starting with $t_1$, the voltage magnitude of the voltage source is 0 V. No power is provided, all LEDs and thus all sets of LEDs are disabled.

At $t_2$, the voltage magnitude of the voltage source is rising. During the rising edge, more and more sets of LEDs are successively enabled. Voltmeter 32 monitors the voltage amplitude and outputs the respective voltage value to signal generator 36, which outputs corresponding control signals to current controllers 108 etc.

At $t_3$, the voltage magnitude of the voltage source is at a maximum. Depending on the design of the LED lighting device, all sets of LEDs 100 to 700 may now be enabled, so that the maximum amount of light is emitted. The individual LEDs are always operated within the range of their nominal voltage, so that optimum efficiency is ensured.

At $t_4$, the voltage magnitude of the voltage source is falling. In the further course of the falling edge of the phase, the sets of LEDs are successively disabled. Thus, all in all, power consumption of the LED lighting device follows the power provided by the voltage source, so that the LED lighting device may also be referred to as a pseudo-resistive load.

At $t_5$, a change in the magnitude of the amplitude can be observed. Here, a fluctuating voltage source 10 is simulated, which is subject to amplitude fluctuations with a larger time constant than the duration of a phase, which regularly occurs in aviation, for example.

At $t_5$, two different cases can be distinguished. In the first case, all sets of LEDs of the LED lighting device 1 have already been enabled at $t_3$, so that the amplitude of voltage source 10 shown at $t_5$ already constitutes an overvoltage. In this case, with further increasing amplitude, the set activation means 30 of LED lighting device 1 will already enable voltage diverting component 900, so that the overvoltage is diverted to voltage diverting component 900.

On the other hand, in a particular case, the LED lighting device 1 may be designed so that within a range of typical system voltages of voltage source 10, not all sets of LEDs are yet enabled at the phase maximum of the AC voltage. In this case, an additional set of LEDs which has not been enabled during the previous phases would be enabled in the short time period around $t_5$ during which the voltage magnitude is higher than the amplitude at $t_3$, e.g. LED set 500 shown in FIG. 1. In this case, the efficiency of the LED lighting device 1 would be higher, since even such voltage fluctuations can be exploited for increased luminous efficiency. However, a slight fluctuation in brightness of the LED lighting device 1 may occur in this particular embodiment, which may be evaluated with regard to their remarkability and consequent aesthetic limitations on the basis of test series.

At time $t_6$ shown in FIG. 2, an overvoltage is finally reached, which may be easily diverted by voltage diverting component 900 so that the LED lighting device 1 continues to emit a constant light output.

All in all, it should therefore be appreciated that with the LED lighting device 1 according to the invention, a power supply unit and other performance-reducing and/or expensive components can be dispensed with and the circuit as a whole can be directly connected to the power source 10 via the connecting means 20, as a kind of pseudo-resistive load. Especially in price-sensitive markets, elimination of additional components is desired and therefore constitutes a basis for continuous further development and thus for inventions. And even the weight advantage resulting from eliminated components is desirable, in particular in aviation.

Figure 3:
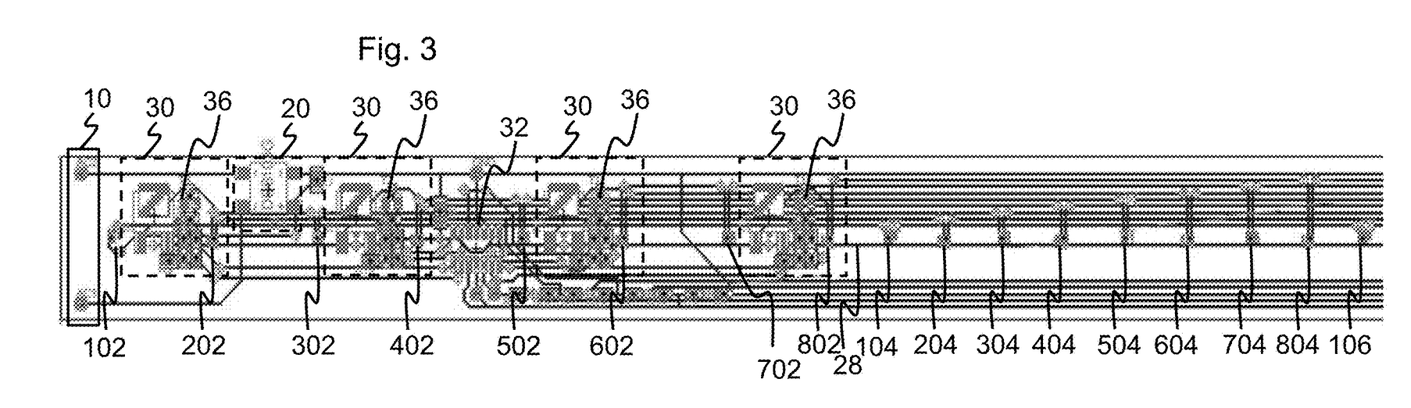
FIG. 3 shows a technical circuit diagram of an implemented LED lighting device.

FIG. 3 shows a technical circuit diagram of an expanded LED lighting device 1. At a first end of the LED lighting device 1, the circuit is supplied with power from voltage source 10. Connector 20 and set activation means 30 are also arranged at this installation end of the LED lighting device 1. In this embodiment, set activation means 30 is distributed to a plurality of regions of the LED lighting device 1. In other words, a plurality of integrated circuits (ICs) perform the task of set activation means 30, and the ICs are arranged on a printed circuit board in such a manner that the other components of the circuit can be driven or supplied with the shortest possible cable lengths and/or with a minimum of installation requirements on the printed circuit board.

For example, this embodiment employs not only a single signal generator 36, rather four signal generators 36 are employed, and each of the signal generators is connected to a part of the sets of LEDs. A voltmeter 32 is also provided.

In the embodiment shown in FIG. 3, particular attention should be directed to the placement of the individual LEDs and their arrangement in sets. The first LED 102 of the first set of LEDs 100 is arranged adjacent to the installation end of the LED lighting device 1. Adjacent to the latter LED, in turn, the first LED 202 of the second set of LEDs 200 is arranged. Again adjacent to the latter, the first LED 302 of the third set of LEDs 300 is arranged. In other words, first LEDs 102, 202, 302, 402, 502, 602, 702, 802 are arranged adjacent to each other. Finally, the first LED 802 of the eighth and last set 800 is followed by the second LED 104 of the first set 100. Furthermore, the assembly comprises LEDs 204, 304, 404, 504, 604, 704, 804, 106 in this example. It is of course possible for the expanded LED lighting device 1 to be assembled with less than eight or more than eight sets of LEDs, the eight sets of LEDs 100, 200, 300, 400, 500, 600, 700, 800 of this example are merely exemplary.

Advantageously, by spacing the LEDs 102, 104, 106 assigned to a set of LEDs 100, and in analogy the LEDs of the other sets of LEDs 200, 300, 400, 500, 600, 700, 800, uniform light distribution is achieved throughout the expanded LED lighting device 1. Here, the inventors discovered that the effect of light distribution of the LED lighting device 1 perceived as homogenous is just particularly favorable if the LEDs, e.g. LEDs 102, 104 106, assigned to a given set of LEDs, e.g. LED set 100, are adjacently surrounded by LEDs which are assigned to another set of LEDs, e.g. LED sets 200, 300, 400, 500, 600, 700, 800. In other words, an LED of the first set of LEDs 100, e.g. 102, is just not adjacently surrounded by the other LEDs 104, 106 of the first set of LEDs 100.

In continuation of this idea, the assembly shown in FIG. 3 was developed, in which the LEDs of all employed sets of LEDs, e.g. sets of LEDs 100, 200, 300, 400, 500, 600, 700, 800, successively alternate. In other words, first, the first LED of each set of LEDs is placed, e.g. LED 102 or LED 202. When all the first LEDs have been placed, the second LED 104 of the first set of LEDs 100, and all the second LEDs of the employed sets of LEDs are placed. This may similarly be applied to an elongated LED lighting device 1 extended along a line, and to an LED lighting device 1 extended over an area.

Assuming that the first set of LEDs 100 is always activated first, at the beginning of a phase, and is deactivated as the last of all LED sets at the end of a phase of the AC voltage, the LEDs of this first set of LEDs 100 will be perceived as brighter than the LEDs of the remaining sets of LEDs, since eventually the light output integrated over time of these LEDs is higher. By distributing the LEDs of the first set of LEDs 100 throughout the expanded LED lighting device 1, a distribution of integrated light output is achieved, whereby homogeneity of perceived brightness is increased. This is further enhanced by mixing the LEDs with the LEDs of further LED sets, 200, 300, 400, 500, 600, 700, 800. By skillfully choosing the spacing between the LEDs, it is thus possible to implement an LED lighting device 1 that is perceived as beautiful and homogeneous and can be produced cost-effectively and with few components and, moreover, is robust against voltage fluctuations.

Figure 4:
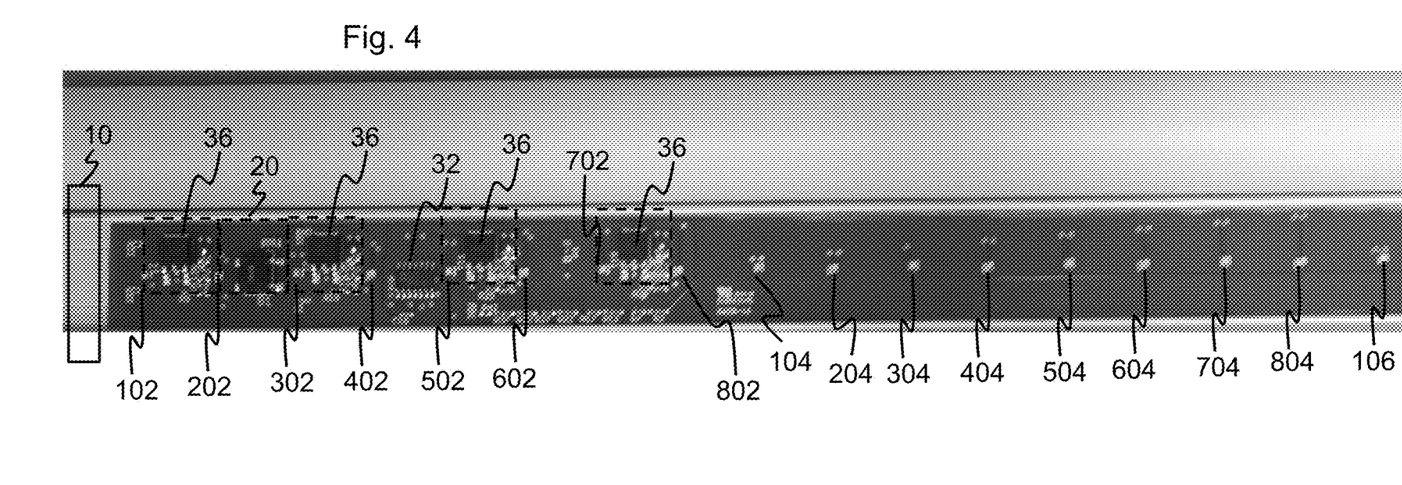
FIG. 4 is a photographic view of an LED lighting device already implemented on laboratory scale.

FIG. 4 shows a photograph of an LED lighting device 1 which has already been developed by the inventors on a laboratory scale and which is an implementation of the circuit diagram shown in FIG. 3. Therefore, like reference numerals represent the same components as described with reference to FIG. 3.

Figure 5:
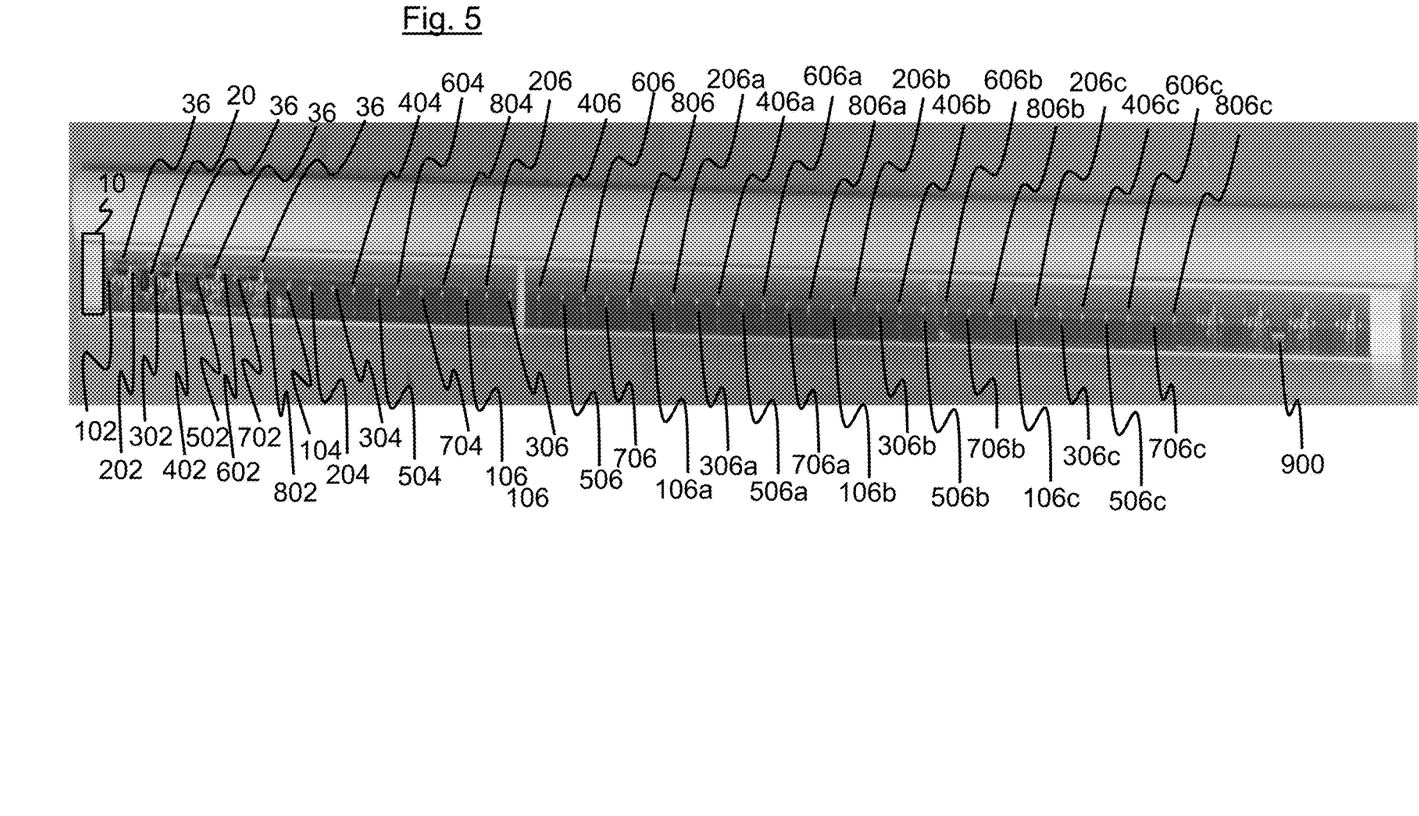
FIG. 5 is a photographic view of a further embodiment of the LED lighting device, with linear extension.

FIG. 5 shows an expanded LED lighting device 1 that comprises a multitude of LEDs. In this LED lighting device, 6 LEDs per LED set are employed in 8 sets of LEDs, which LEDs are arranged so as to successively alternate. With the LED lighting device shown in FIG. 5, a homogeneous cabin lighting for a wide body aircraft has been tested in laboratory, which easily compensates for over voltages by means of voltage diverting component 900, while at the same time the LED lighting device 1 emits a constant light output even in case of voltage fluctuations. The strong fluctuations in supply voltage usual in this field, which were heretofore visible for all passengers in the cabin according to the prior art, can now be made invisible with the invention. This moreover provides an improvement of safety on board from a psychological point of view, because it is just such easily visible fluctuations and deviations that may lastingly disturb trust in technology, for instance in people with fear of flying.

Figure 6:
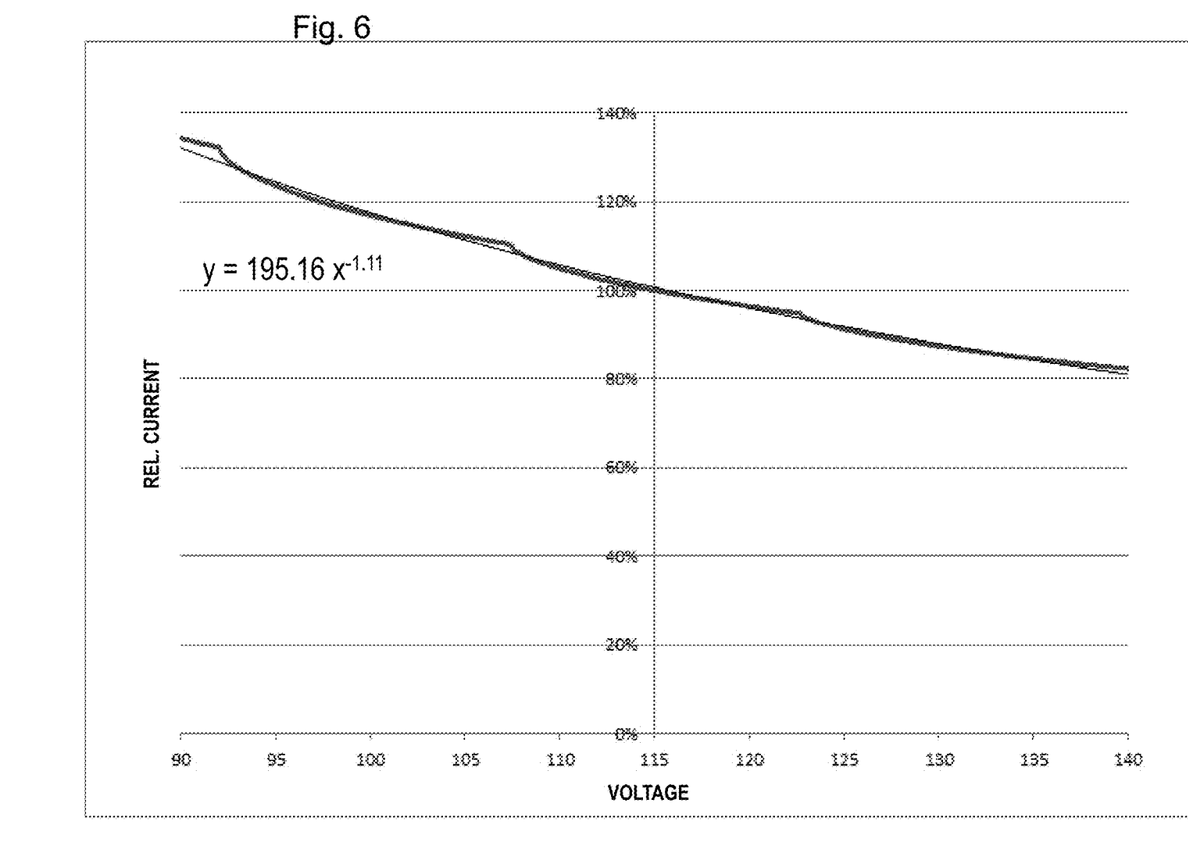
FIG. 6 is a graph of an optional correction of amperage by the current controllers.

FIG. 6 shows how in case of changing voltage the amperage passing through the LEDs can be adapted by the respective current controller 108, 208, 308, 408, 508, 608, 708, 808, such that overall brightness of the LED lighting device 1 can be kept constant throughout the range of input voltages shown. This rather complicated adjustment of amperage provides compensation for the fact that with increasing voltage the LEDs exhibit increasing brightness, albeit only slightly. The amperage profile shown, which takes into account the switching thresholds with visible buckling points at which further sets of LEDs are connected, provides for even further homogenized light output of the LED lighting device 1.

Figure 7A:
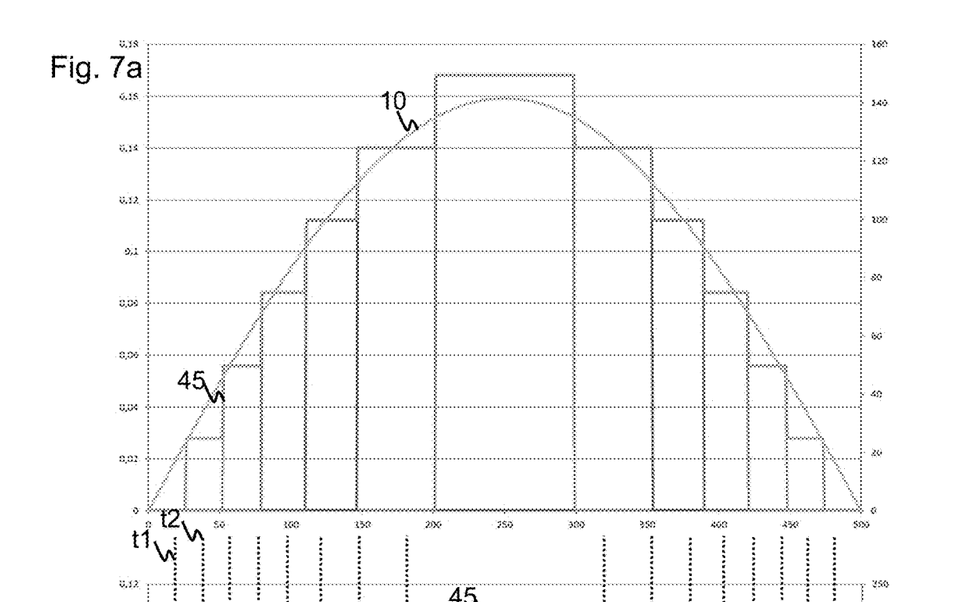
FIG. 7a shows an exemplary voltage waveform.
Figure 7B:
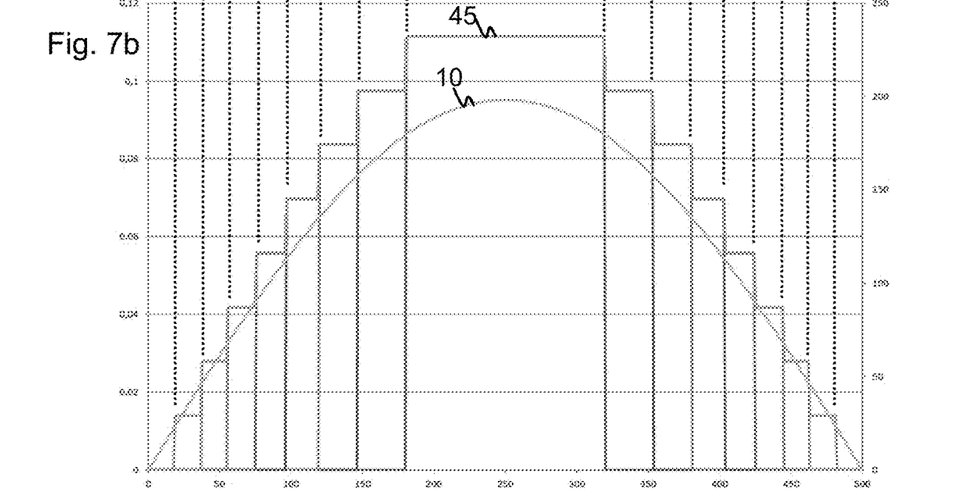
FIG. 7b shows an exemplary voltage waveform with higher amplitude.

FIGS. 7A and 7B show two graphs linked together by a common time axis. FIG. 7a shows an exemplary voltage waveform of voltage source 10 downstream rectifier 22 with an amplitude of 140 volts, in this example. Initially, at the beginning of the chart, from t=0 the source voltage increases, but LEDs cannot be enabled, since the source voltage is still below the threshold voltage of the LEDs, or since the source voltage is below the preset value. When the threshold voltage is reached, current flows through the LEDs of the first set of LEDs 100, so that the amperage 45 flowing through the LEDs abruptly rises. When the preset value is reached the next time, the LEDs of the second set of LEDs 200 are connected, whereby amperage 45 doubles. The amperage then further rises in steps, when further sets of LEDs are enabled. The same process in reverse order is performed in case of a falling edge, so that the amperage 45 gradually falls in steps.

In the lower part, i.e. in FIG. 7b, a voltage waveform of voltage source 10 is shown with an exemplary amplitude of 200 volts, i.e. a higher amplitude than in FIG. 7a.

A comparison of the time course of the two graphs illustrates, with reference to the indicated lines at t1, t2, etc., that in case of a higher amplitude of the voltage source, the LEDs are connected earlier. Earlier connection of the LEDs causes higher light output. Therefore, the current controllers are adapted to decrease the amperage 45 in case of a higher maximum voltage. This will also be apparent from FIGS. 7a, 7b when comparing the two amperage profiles 45.

Moreover, in the exemplary voltage waveform of FIG. 7b (lower graph), an additional set of LEDs or the voltage diverting component 900 is activated. By enabling voltage diverting component 900, the electric power can be safely diverted without causing an increase in brightness of the LED lighting device 1.

It will be apparent to those skilled in the art that the embodiments described above are meant to be exemplary and that the invention is not limited thereto but may rather be varied in many ways without departing from the scope of the claims. Furthermore, it will be apparent that the features, regardless of whether they are disclosed in the description, the claims, the figures, or otherwise, can define essential components of the invention alone, even if they are described together with other features.

LIST OF REFERENCE NUMERALS

1 LED lighting device
10 Voltage source
20 Connecting means
22 Rectifier
24 Electrical line
26 Electrical line
28 Electrical line
30 Set activation means
32 Voltmeter
34 Voltage signal line
36 Signal generator
38 Amperemeter
45 Amperage flowing through LEDs
100 First set of LEDs
102 First LED of the first set of LEDs
104 Second LED of the first set of LEDs
106 Third LED of the first set of LEDs
108 Current controller of the first set of LEDs
110 Signal line to the current controller of the first set of LEDs
112 Switching means of the first set of LEDs
200 Second set of LEDs
202 First LED of the second set of LEDs
204 Second LED of the second set of LEDs
206 Third LED of the second set of LEDs
208 Current controller of the second set of LEDs
210 Signal line to the current controller of the second set of LEDs
212 Switching means of the second set of LEDs
300 Third set of LEDs
302 First LED of the third set of LEDs
304 Second LED of the third set of LEDs
306 Third LED of the third set of LEDs
308 Current controller of the third set of LEDs
310 Signal line to the current controller of the third set of LEDs
312 Switching means of the third set of LEDs
400 Fourth set of LEDs
402 First LED of the fourth set of LEDs
404 Second LED of the fourth set of LEDs
406 Third LED of the fourth set of LEDs
408 Current controller of the fourth set of LEDs
410 Signal line to the current controller of the fourth set of LEDs
412 Switching means of the fourth set of LEDs
500 Fifth set of LEDs
502 First LED of the fifth set of LEDs
504 Second LED of the fifth set of LEDs
506 Third LED of the fifth set of LEDs
508 Current controller of the fifth set of LEDs
510 Signal line to the current controller of the fifth set of LEDs
512 Switching means of the fifth set of LEDs
600 Sixth set of LEDs
602 First LED of the sixth set of LEDs
604 Second LED of the sixth set of LEDs
606 Third LED of the sixth set of LEDs
608 Current controller of the sixth set of LEDs
610 Signal line to the current controller of the sixth set of LEDs
612 Switching means of the sixth set of LEDs
700 Seventh set of LEDs
702 First LED of the seventh set of LEDs
704 Second LED of the seventh set of LEDs
706 Third LED of the seventh set of LEDs
708 Current controller of the seventh set of LEDs
710 Signal line to the current controller of the seventh set of LEDs
712 Switching means of the seventh set of LEDs
900 Voltage diverting component
902 First diode of voltage diverting component
904 Second diode of voltage diverting component
906 Third diode of voltage diverting component
908 Current controller of voltage diverting component
910 Signal line to the current controller of voltage diverting component
912 Switching means of voltage diverting component
106a,b,c, 206a through 806c Further serially connected LEDs; the first digit of the reference numeral reflects the membership to a set of LEDs

What is claimed is:

1. An LED lighting device for connection to an AC voltage source, comprising:
a first set of light emitting diodes (LEDs);
a second set of LEDs;
at least one LED assigned to the first set of LEDs;
at least one LED assigned to the second set of LEDs and electrically arranged in series;
a connector connectable to the AC voltage source; and
a set activator having a voltmeter, a signal generator, and a current controller, the voltmeter measuring a currently applied voltage amplitude of the AC voltage source, the signal generator generating an activation instruction in response to the currently applied voltage amplitude, and the current controller controlling current flowing through the at least first and second sets of LEDs.

2. The LED lighting device as claimed in claim 1, further comprising a switch that enables or disables at least one set of LEDs in response to the activation instruction so that the LEDs are enabled or disabled in sets.

3. The LED lighting device as claimed in claim 1, wherein the LEDs of the first and second sets of LEDs are along a line.

4. The LED lighting device as claimed in claim 1, wherein the LEDs of the first and second sets of LEDs are uniformly distributed over an area.

5. The LED lighting device as claimed in claim 1, wherein the LEDs of the first and second sets of LEDs are distributed in a checkerboard pattern.

6. The LED lighting device as claimed in claim 1, further comprising:
a third set of LEDs; and
at least one LED assigned to the third set of LEDs.

7. The LED lighting device as claimed in claim 6, wherein the LEDs of each of the first, second, and third sets of LED's is adjacently surrounded by LEDs that are assigned to another of the first, second, and third sets of LEDs.

8. The LED lighting device as claimed in claim 2, wherein the switch is configured to adjust a number of enabled LED sets so that the LEDs of the first and second sets of LEDs are operated near a nominal voltage.

9. The LED lighting device as claimed in claim 1, further comprising at least one voltage diverting component, wherein the switch is adapted for diverting an excess voltage via the at least one voltage diverting component.

10. The LED lighting device as claimed in claim 9, wherein the at least one voltage diverting component comprises a non-luminous component.

11. The LED lighting device as claimed in claim 10, wherein the non-luminous component comprises a non-luminous diode or a non-luminous resistor.

12. The LED lighting device as claimed in claim 1, wherein the LEDs of the first and second sets of LED's are assigned to a first diode string.

13. The LED lighting device as claimed in claim 12, further comprising a second diode string electrically arranged in parallel to the first diode string.

* * * * *